United States Patent
Schrader

[11] 3,823,891
[45] July 16, 1974

[54] FILM CARTRIDGE

[76] Inventor: Hellmut Schrader, 3071 Eilvese, Nr 166 Germany

[22] Filed: Nov. 7, 1972

[21] Appl. No.: 304,332

[30] Foreign Application Priority Data
Nov. 9, 1971   Germany............................ 2155521

[52] U.S. Cl..................................... 242/71.1, 95/31
[51] Int. Cl. .............................................. G03b 1/04
[58] Field of Search ............... 242/71.1, 71.2; 95/31

[56] References Cited
UNITED STATES PATENTS
| | | | |
|---|---|---|---|
| 1,694,401 | 12/1928 | Slocum ............................. | 242/71.1 |
| 2,484,248 | 10/1949 | Roehrl .............................. | 242/71.1 |
| 3,333,785 | 8/1967 | Baur et al. ......................... | 242/71.1 |
| 3,356,311 | 12/1967 | Winkler et al...................... | 242/71.1 |
| 3,539,132 | 11/1970 | Smitzer............................ | 242/71.1 X |

FOREIGN PATENTS OR APPLICATIONS
| | | | |
|---|---|---|---|
| 876,817 | 8/1942 | France............................... | 242/71.1 |
| 622,646 | 5/1949 | Great Britain...................... | 242/71.1 |

Primary Examiner—John W. Huckert
Assistant Examiner—Milton S. Gerstein
Attorney, Agent, or Firm—Spencer & Kaye

[57] ABSTRACT

A film cartridge capable of receiving a continuous film wherein the cartridge includes spiral shaped guide members coiling the film when it is introduced into the cartridge, and wherein the guide members have several breaks in their curvature to provide a spiral like spring which touches the coiled film only at discrete points.

8 Claims, 4 Drawing Figures

FILM CARTRIDGE

BACKGROUND OF THE INVENTION

The present invention relates to a film cartridge capable of receiving and enclosing a film, particularly a photographic film.

In the photographic art it is often necessary to transport coiled films from one cartridge to another cartridge. This is most commonly performed by rotating a reel to which one end of the film is fastened. This can also be performed by providing in the cartridge spiral shaped springs acting as guide members for a film the end of which is introduced into the cartridge so that the film is coiled up by the springs when moved into the cartridge.

One disadvantage associated with cartridges utilizing reels is the need for a complicated driving machanism. One disadvantage of cartridges utilizing a driving mechanism to introduce the film into cartridges having guide members only is undesired friction.

SUMMARY OF THE INVENTION

It is an object of the present invention to provide a cartridge which allows use of a simple transport mechanism. This and other objects according to the invention are achieved by utilizing a cartridge having a guide member for coiling the film when it is moved into the cartridge, which guide member is a sprial spring having several breaks in its curvature.

DESCRIPTION OF THE PREFERRED EMBODIMENTS

Figure 1:
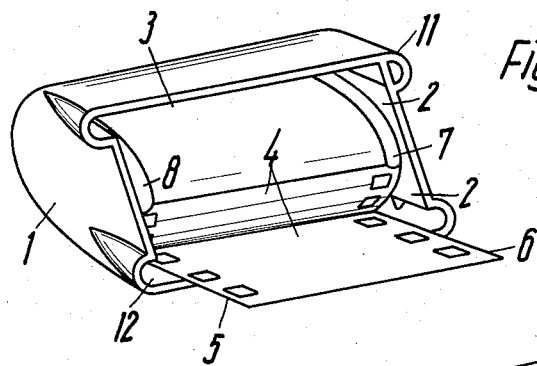
FIG. 1 is an exploded perspective view of a cartridge according to a prior invention of the applicant.

In FIG. 1 there is shown a perspective view of a cartridge 1 having an opening 2 through which a leaf spring 3 is fastened to the cartridge. The leaf spring 3 can be made of plastic or metal, particularly bronze. Good results were experimentally achieved, too, by utilizing springs made of spring steel and a metal denoted by MS 63. The width of the leaf spring is designed so that the edges 5,6 of a film-tape 4 are guided by the edges of the leaf spring 3 to coil the film 4 when it is moved into the cartridge. The center part of the leaf spring guides the center part of the front end of the film 4 so that the coiling of the film is assured even for the first coil turn. For reducing undesired friction and damage to the film, the edges 7,8 of the leaf spring protrude in the direction of the film 4 so that due to its rigidity the film 4 touches only the edges 7,8 after one winding turn is coiled. The edges 7,8 may be constituted by stiffening corrugations. As the film 4 is guided only along the edges 5,6, damage to the sensitive sheet on the film is avoided. Once the first winding of the film is coiled, the film 4 is stabilized so that its center part no longer touches the center part of the leaf spring 3. The leaf spring 3 in FIG. 1 is fastened to the cartridge by cementing, clamping or welding.

Figure 2:
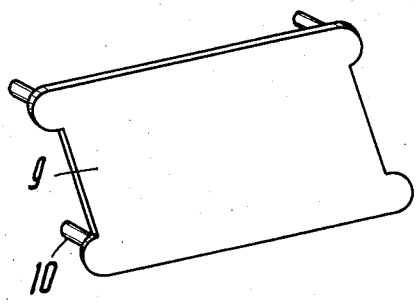
FIG. 2 is a simplified cross-sectional side view of the cartridge of FIG. 1.
Figure 2:
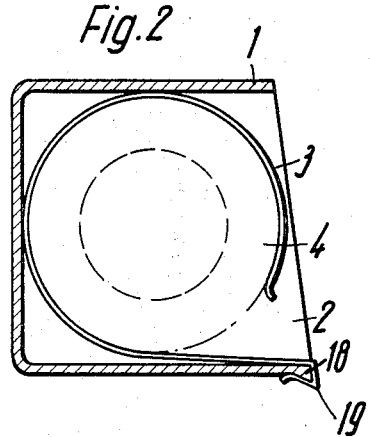

In FIG. 2 the leaf spring 3 is fastened to the cartridge by mechanically locking. For this purpose there is provided at the front end of the lower wall of the cartridge a thicker part 18 and the leaf spring 3 is provided with a corresponding part 19 capable of snapping over the thicker part 18. By utilizing such a type of connection of cartridge and spring, the time necessary for connecting these elements is reduced since the exact relative positions of the elements is no longer of great importance. This is true for a manual procedure as well as an automatic procedure. The cartridge shown was designed to be manufactured by diecasting.

Figure 3:
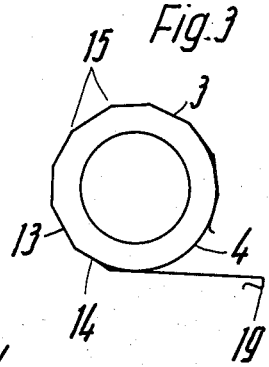
FIG. 3 is a side view of a guide member according to one embodiment of the invention, for a cartridge according to FIG. 2.

The cartridges shown in FIGS. 1 and 2 have been found to produce good results as to the guidance of the film 4. Nevertheless, they have been found to require too high a force to move the film into the cartridge. The embodiment of the invention shown in FIG. 3 overcomes this disadvantage associated with the prior cartridge. FIG. 3 shows a side view of a spring intended for the use in a cartridge according to FIG. 2, but which can be used with other types of connections and cartridge configurations.

The spring 3 may consist of one leaf spring, as in FIG. 1, or of two or three single springs. As shown in FIG. 3 the spring 3 is spirally formed by providing several breaks 15 in its curvature. The length of the segments 13,14 connected by the breaks 15 is chosen so that the film 4 touches only the center part of each segment. Therefore, the friction between film 4 and spring 3 is reduced. Further the breaks 15 act as bearings for the adjacent segments 13,14 so that every segment 13,14 is a spring the spring action of which depends on the length of the segment. This design of the spring 3 allows construction of a spring having a small diameter when the cartridge is empty and a large diameter when the cartridge is filled by a film 4. The ratio between the diameters for the filled and empty states can be made larger for the cartridge according to the invention than for the springs according to FIG. 2. The spiral spring in FIG. 3 has the form of approximately only one turn of a spiral. The spring can also be formed to have a plurality of spiral turns by designing the spring so that the segments 13,14 of the outer turn of such a spiral have a softer spring action than the segments 13,14 of the inner turn, thereby achieving improved spring action with a filled cartridge. In addition such a design improves the protection of the film against dust.

When utilizing the design of FIG. 3 for a leaf spring of the general type shown in FIG. 1, the stiffening corrugations 7 and 8 would oppose the function of the breaks. With such a spring the corrugations are therefore deformed at the location of the breaks 15 so that they will not, or nearly not, protrude in the region of the breaks.

Figure 4:
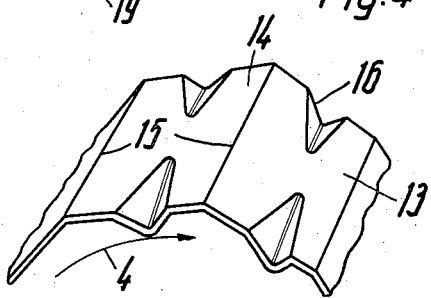
FIG. 4 is a detail view of a part of a guide member according to another embodiment of the invention.

FIG. 4 shows the details of a modified version of the spring of FIG. 3. There are shown two adjacent segments 13,14 separated by a break 15. The segments 13,14 are provided at their edges with curved protrusions 16 each having the guide function of the continuous stiffening corrugations 7 and 8 in FIG. 1. The protrusions 16 are curved in such a way that the front end of the film 4 can easily slip over the protrusions. The protrusions 16 may have a long leading edge surface and a short trailing edge surface, with a smoothed peak joining these surfaces. The spring 4 can be designed to coil the film 4 around a circular spool. This can be achieved e.g. by utilizing a spring 3 having segments 13,14 of different lengths. The width of the spring 3 can be made larger than that of the film 4. For avoiding contact between the edges of the spring and the sidewalls of the cartridge the width of the spring may be chosen smaller than the width of the cartridge. In this case the sidewalls of the cartridge guide the edges of the film 4. The protrusions 16 rise slowly from the segments 13,14 to their peaks at the edges of the spring. The protrusions 16 in FIG. 4 are shown in enlarged view relative to the area of the segments 13,14. The cartridge 1 can be closed by a cover flap 9. The cover flap 9 can be provided with pins 10 adapted to pass through holes 11 or similar arrangements in the cartridge for closing the opening of the cartridge. The cover 9 csn be provided with a surface allowing labeling. The cartridge described is of essential importance for safekeeping of developed films. Films enclosed by such cartridge can easily and often be viewed or used for laboratory works as e.g. printing. For use of undeveloped films the cover flap 9 can be provided with a slot for the film.

What is claimed is:

1. A cartridge for a roll film comprising: a housing defining a film receiving chamber and having an opening through which the film may be moved lengthwise into or from said chamber and rolling means provided in said chamber for forming the film into a roll as the film moves through said opening and into said chamber, said rolling means including at least one substantially spiral spring located in said chamber and with only one end of said spring secured to said housing, said one end being secured along one side of the opening, the other end of said spring and the portion of said spring between its ends being spaced from the walls of said chamber, and said spring being constituted by a series of segments spaced along the spiral length of said spring with the boundary between each adjacent pair of segments being constituted by a break.

2. A cartridge according to claim 1 wherein segments at different points along the length of said spring have respectively different lengths.

3. A cartridge according to claim 1 wherein said segments are provided with protrusions which protrude at the edges of said spring between adjacent breaks towards the region to be occupied by a film introduced into the cartridge. occupied by a film introduced into the cartridge.

4. A cartridge according to claim 3 wherein the protrusions are provided with a long leading edge surface, a short trailing return surface, and a smoothed peak joining said surfaces.

5. A cartridge according to claim 3 wherein the height of each protrusion increases gradually from the surface of its respective segment up to the edge of said spring.

6. A cartridge according to claim 1, further comprising a cover flap for closing the opening.

7. A cartridge according to claim 1 wherein the spring is made of metal.

8. A cartridge according to claim 1 wherein the spring is made of plastic.

* * * * *